United States Patent
Hirakawa et al.

(10) Patent No.: US 7,861,812 B2
(45) Date of Patent: Jan. 4, 2011

(54) VEHICLE

(75) Inventors: Mitsuaki Hirakawa, Wako (JP);
Takeshi Fujino, Wako (JP); Minoru Noguchi, Wako (JP); Eisuke Komazawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 282 days.

(21) Appl. No.: 12/076,614

(22) Filed: Mar. 20, 2008

(65) Prior Publication Data
US 2008/0230290 A1 Sep. 25, 2008

(30) Foreign Application Priority Data
Mar. 23, 2007 (JP) .............................. 2007-076557
Mar. 11, 2008 (JP) .............................. 2008-060588

(51) Int. Cl.
*B60K 1/00* (2006.01)
(52) U.S. Cl. ................... 180/65.31; 180/65.1; 180/68.5
(58) Field of Classification Search ............... 180/68.5, 180/68.4, 65.1, 65.245, 65.31, 65.25, 65.265, 180/301, 302; 429/13, 26
See application file for complete search history.

(56) References Cited

U.S. PATENT DOCUMENTS

| | | | | |
|---|---|---|---|---|
| 5,193,635 A * | 3/1993 | Mizuno et al. | ........... | 180/65.25 |
| 5,641,031 A * | 6/1997 | Riemer et al. | ................. | 429/13 |
| 6,378,637 B1 * | 4/2002 | Ono et al. | ................. | 180/65.31 |
| 6,598,691 B2 * | 7/2003 | Mita et al. | .................. | 180/65.1 |
| 6,874,588 B2 * | 4/2005 | Kato et al. | .................. | 180/65.1 |
| 6,907,947 B2 * | 6/2005 | Morita et al. | ............... | 180/301 |
| 6,923,281 B2 * | 8/2005 | Chernoff et al. | ........ | 180/65.245 |
| 6,978,855 B2 * | 12/2005 | Kubota et al. | .............. | 180/65.1 |
| 7,198,124 B2 * | 4/2007 | Amori et al. | ............... | 180/68.5 |
| 7,540,343 B2 * | 6/2009 | Nakashima et al. | ........ | 180/65.1 |
| 7,559,389 B2 * | 7/2009 | Yamashita | ............... | 180/65.31 |
| 7,631,712 B2 * | 12/2009 | Watanabe | .................. | 180/68.5 |
| 7,637,335 B2 * | 12/2009 | Hayashi | ..................... | 180/68.5 |

FOREIGN PATENT DOCUMENTS

| | | |
|---|---|---|
| JP | 2001-268710 | 9/2001 |
| JP | 2006-089040 | 4/2006 |

* cited by examiner

*Primary Examiner*—Hau V Phan
(74) *Attorney, Agent, or Firm*—Squire, Sanders & Dempsey L.L.P.

(57) ABSTRACT

A vehicle suitable in consideration of each of an electric power supply amount to a motor and a mounting space of a fuel cell or the like is provided. The outputs of a fuel cell and a battery are raised in voltage by a voltage raising device, and electric power of these raised voltages is supplied to a motor. A total output voltage of the fuel cell and the battery, and their total volume can be correspondingly reduced. The total volume of a group is reduced including the fuel cell, the battery and the voltage raising device, and a mounting space of the group in the vehicle. A space of a frame on an upper side of a floor panel and a lower side of a seat in a vehicle interior space can be utilized effectively as the mounting space of the group, without enlarging the space of the frame.

7 Claims, 4 Drawing Sheets

VEHICLE

FIELD OF THE INVENTION

The present invention relates to a vehicle having a fuel cell and a motor for running.

BACKGROUND ART

Vehicles mounting the fuel cell and other structural objects in various modes are proposed in view of security of the area of an interior space or the like (Japanese Patent Laid-Open No. 2001-268710 and Japanese Patent Laid-Open No. 2006-089040).

However, if the fuel cell is enlarged in size to increase an electric power supply amount to the motor for running, a wide space is required for mounting the same. On the other hand, if the fuel cell or the like is made smaller in size, there is a possibility that the electric power supply amount to the motor becomes insufficient.

SUMMARY OF THE INVENTION

Therefore, an object of the present invention is to provide a vehicle suitable in consideration of each of the electric power supply amount to the motor and the mounting space of the fuel cell or the like.

The vehicle of a first aspect of the present invention is a vehicle provided with a fuel cell and a motor for running, comprising a battery; a voltage raising device in which the fuel cell and the battery are connected in parallel to an input section thereof, and an output section thereof is connected to the motor; and an electronic control unit which controls an operation of the motor by adjusting electric power outputted from the fuel cell and the battery and supplied to the motor by a motor drive unit via a raise in voltage of the voltage raising device; wherein each article included in a designated article group including at least the fuel cell, the battery and the voltage raising device among an article group mounted to the vehicle is mounted to a space located on the upper side of a floor panel and the lower side of a seat in a vehicle interior space.

In accordance with the vehicle of the first aspect of the present invention, the outputs of the fuel cell and the battery are raised in voltage by the voltage raising device, and electric power of these raised voltages is supplied to the motor. Therefore, a total output voltage of the fuel cell and the battery can be correspondingly reduced. Thus, it is possible to reduce the number of cells laminated in the fuel cell, the volume of the fuel cell, and the volume of the battery. Namely, it is possible to reduce the total volume of the designated article group including the fuel cell, the battery and the voltage raising device, and thus, a mounting space of the designated article group in the vehicle. Further, spaces on the upper side of a floor panel and the lower side of a seat in an interior space existing in the vehicle can be utilized effectively as the mounting space of the designated article group without enlarging these spaces on the upper side of the floor panel and the lower side of the seat.

In the vehicle of a second aspect of the present invention in the vehicle of the first aspect of the present invention, a frame for reinforcing a vehicle body is arranged on the upper side of the floor panel and the lower side of the seat in the vehicle interior space, and each article included in the designated article group is mounted or stored to a clearance of the frame.

In accordance with the vehicle of the second aspect of the present invention, clearances of the existing frame for reinforcing a vehicle body arranged on the upper side of the floor panel and the lower side of the seat in the vehicle interior space for securing safety of a crew member can be utilized effectively as the mounting space of the designated article group. Further, since the total volume of the designated article group is reduced as mentioned above, it is possible to avoid a reduction in strength due to a reduction in weight of the frame for enlargement of the clearance or the space. Further, manufacture efficiency of the vehicle is improved by assembling the frame into the vehicle body after the designated article group is assembled into the frame so as to be stored into the clearances. Further, the designated article group can be protected by the frame from an impact applied to the vehicle.

In the vehicle of a third aspect of the present invention in the vehicle of the second aspect of the present invention, the frame is constructed by combining a first framework member and a second framework member arranged such that their longitudinal directions are respectively conformed to a forward-backward direction and a left-right direction of the vehicle, and the strength of the longitudinal direction of the second framework member is designed so as to be lower than the strength of the longitudinal direction of the first framework member.

In accordance with the vehicle of the third aspect of the present invention, the strength of the longitudinal direction of the second framework member is set to be lower than that of the first framework member from a view point at which the strength of a forward-backward direction of the vehicle body having a comparatively high possibility receiving an impact by coming in contact with an object is preferably set to be stronger than the strength of a left-right direction of the vehicle body. It is possible to correspondingly widen the clearances of the frame as the mounting space of the designated article group demarcated by the first framework member and the second framework member.

In the vehicle of a fourth aspect of the present invention in the vehicle of the first aspect of the present invention, one or both of the electronic control unit and the motor drive unit are included in the designated article group.

In accordance with the vehicle of the fourth aspect of the present invention, the space of the lower side of the seat in the interior space existing in the vehicle can be utilized effectively as the mounting space of the designated article group including the electronic control unit in addition to the fuel cell and the like.

In the vehicle of a fifth aspect of the present invention in the vehicle of the first aspect of the present invention, a voltage converter and a secondary battery connected to the output section of the voltage raising device through the voltage converter are included in the designated article group, and electric power supplied from the secondary battery to the motor via the voltage converter and electric power supplied from the voltage raising device to the secondary battery via the voltage converter are controlled by controlling an operation of the voltage converter by the electronic control unit.

In accordance with the vehicle of the fifth aspect of the present invention, since the supply of electric power to the motor using the fuel cell and the battery is assisted by the secondary battery, the total capacity of the fuel cell and the battery can be reduced. Thus, it is possible to reduce the volumes of the fuel cell and the battery, and thus, the designated article group. Further, as mentioned above, the space of the lower side of the seat in the interior space existing in the vehicle can be utilized effectively as the mounting space of the designated article group including the fuel cell, the battery and the like.

In the vehicle of a sixth aspect of the present invention in the vehicle of the first aspect of the present invention, a total output value of the fuel cell and the battery is set to a target output value or more, and a first density as a ratio of the total output value of the fuel cell and the battery to a total volume or a total weight of the designated article group is set to a first reference value or more.

In accordance with the vehicle of the sixth aspect of the present invention, a total output value $\Sigma P$ of the fuel cell and the battery is set to a target output value $P_0$ or more, and a first density $D_1$ ($=\Sigma P/\Sigma V$ or $\Sigma P/\Sigma M$) as a ratio of the total output value $\Sigma P$ to a total volume $\Sigma V$ or a total weight $\Sigma M$ of the designated article group is set to a first reference value $D_{10}$ or more. Thus, the total volume $\Sigma V$ or the total weight $\Sigma M$ of the designated article group including at least the fuel cell, the battery and the voltage raising device is restrained to a value ($=D_{10}/P_0$) or less provided by dividing the first reference value $D_{10}$ by the target output value $P_0$. Accordingly, while an electric power supply amount to the motor is maintained in a necessary sufficient amount in view of stable running of the vehicle and the like, the mounting space of the designated article group in the vehicle is saved or the total weight of the vehicle can be reduced.

In the vehicle of a seventh aspect of the present invention in the vehicle of the first aspect of the present invention, a total capacity of the fuel cell and the battery is set to a target capacity or more, and a second density as a ratio of the total capacity of the fuel cell and the battery to a total volume or a total weight of the designated article group is set to a second reference value or more.

In accordance with the vehicle of the seventh aspect of the present invention, a total capacity $\Sigma C$ of the fuel cell and the battery is set to a target capacity $C_0$ or more, and a second density $D_2$ ($=\Sigma C/\Sigma V$ or $\Sigma C/\Sigma M$) as a ratio of the total capacity $\Sigma C$ to the total volume $\Sigma V$ or the total weight $\Sigma M$ of the designated article group is set to a second reference value $D_{20}$ or more. Thus, the total volume $\Sigma V$ or the total weight $\Sigma M$ of the designated article group is restrained to a value ($=D_{20}/C_0$) or less provided by dividing the second reference value $D_{20}$ by the target capacity $C_0$. Accordingly, while a total electricity accumulating amount able to be supplied to the motor is maintained in a necessary sufficient amount in view of extension of a running distance of the vehicle or the like, the mounting space of the designated article group in the vehicle is saved or the total weight of the vehicle can be reduced.

The vehicle of an eighth aspect of the present invention in the vehicle of the first aspect of the present invention has a capacitor instead of the battery.

In accordance with the vehicle of the eighth aspect of the present invention, the space on the upper side of the floor panel and the lower side of the seat in the interior space existing in the vehicle can be utilized effectively as a mounting space of the designated article group (including the fuel cell, the capacitor and the voltage raising device) without extending this space on the upper side of the floor panel and the lower side of the seat. In particular, electric power output time can be extended while the capacitor is made small in size or compact in comparison with the battery.

DESCRIPTION OF THE PREFERRED EMBODIMENTS

An embodiment of a vehicle of the present invention will be explained by using the drawings.

Figure 1:
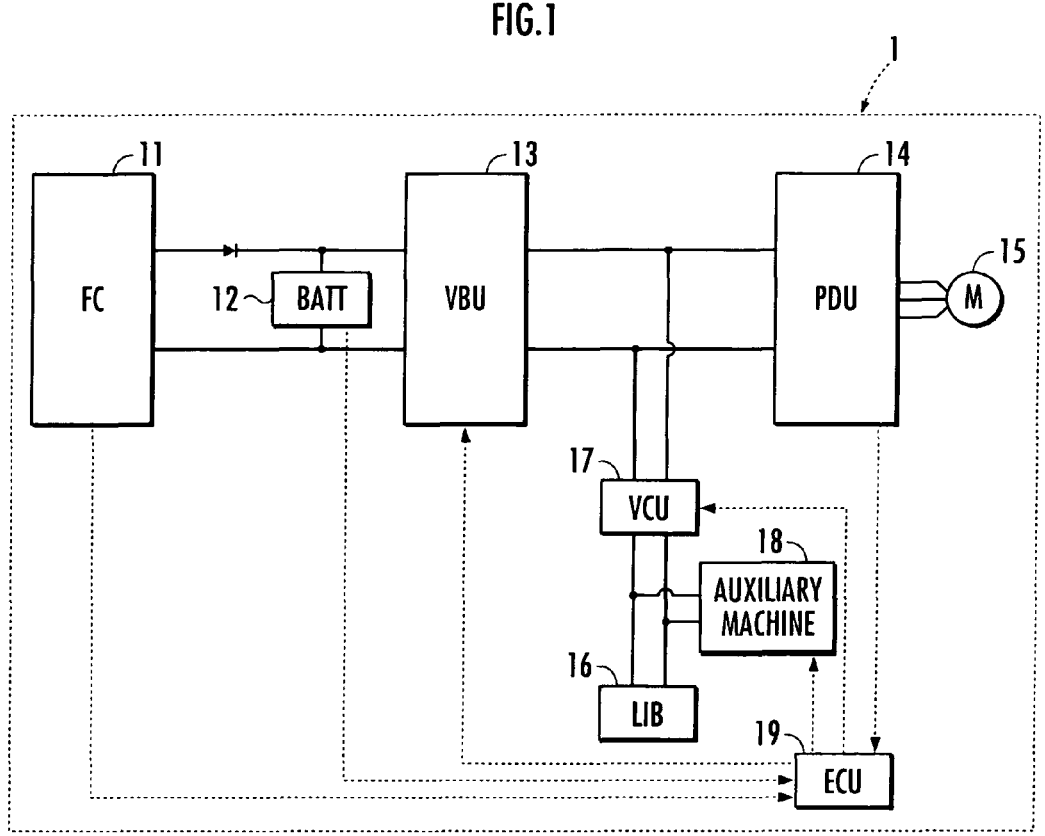
FIG. 1 is a constructional explanatory view of a vehicle of the present invention.
Figure 2:
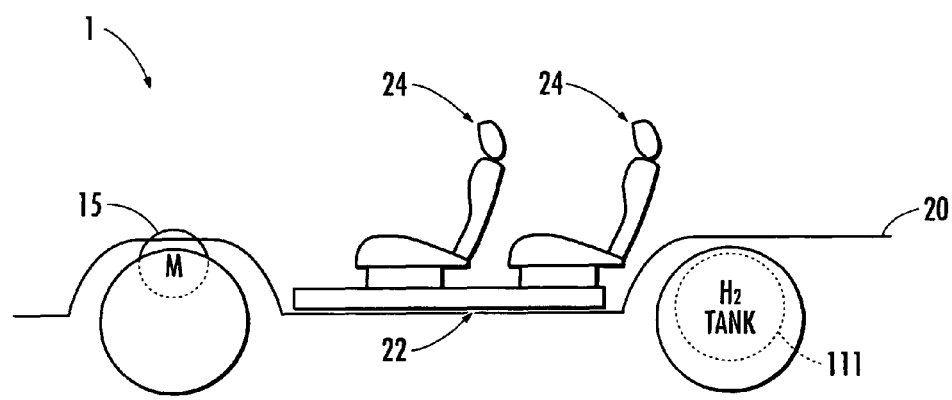
FIG. 2 is a constructional explanatory view of the vehicle of the present invention.

As shown in FIG. 1, a fuel cell (FC) 11, a battery (BATT) 12, a voltage raising device (VBU (DC/DC converter)) 13, a motor drive unit (PDU (power drive unit)) 14, a motor for running (M) 15, a secondary battery (LIB (lithium battery)) 16, a voltage converter (VCU) 17, an auxiliary machine 18, and an electronic control unit (ECU) 19 are mounted to the vehicle 1. Further, as shown in FIG. 2, a fuel tank 111 and an FC system 112 are also mounted to the vehicle 1.

The fuel cell 11 and the battery 12 are connected in parallel to an input section of the voltage raising device 13. The motor 15 and the secondary battery 16 are respectively connected in parallel to an output section of the voltage raising device 13 through the motor drive unit 14 and the voltage converter 17.

The motor drive unit 14 controls the operation of the motor 15 or the like by adjusting electric power outputted from the fuel cell 11 and the battery 12 and supplied to the motor 15 via a raising voltage provided by the voltage raising device 13. Further, the motor drive unit 14 controls electric power supplied from the secondary battery 16 to the motor 15 via the voltage converter 17 and electric power supplied from the voltage raising device 13 to the secondary battery 16 via the voltage converter 17 by controlling the operation of the voltage converter 17.

The auxiliary machine 18 includes "a first auxiliary machine" constituting the FC system 112, such as an air pump for supplying fuel such as hydrogen gas, air or the like from the fuel tank 111 to the fuel cell 11, a water pump for circulating cooling water of the fuel cell 11, a humidifier, a fuel cell heater or the like, and also includes "a second auxiliary machine" such as a fan for cooling of the battery 12, an air-conditioning system or the like.

As shown in FIG. 2, a frame 22 for reinforcing a vehicle body is arranged on the upper side of a floor panel 20 and the lower side of a seat 24 in an interior space of the vehicle.

Figure 3:
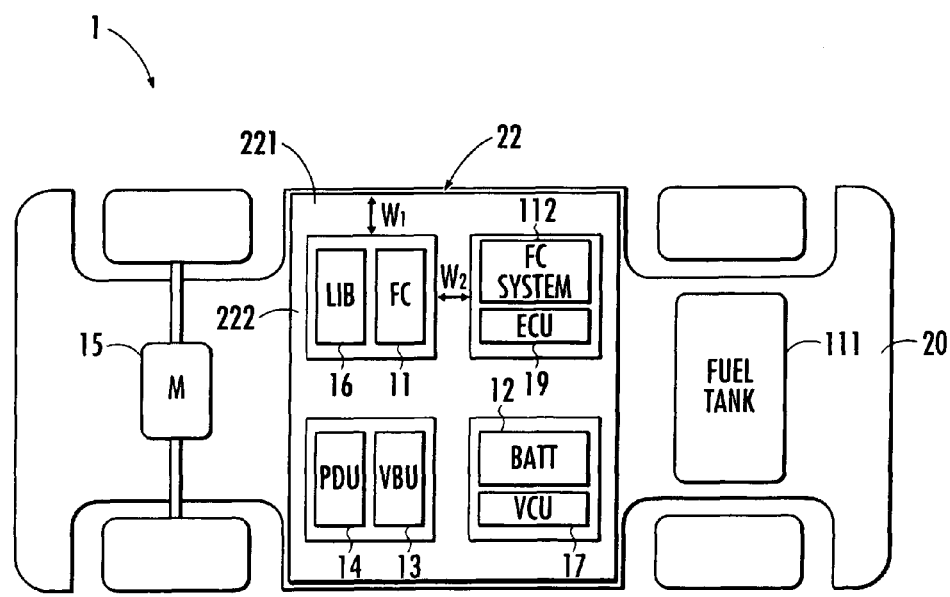
FIG. 3 is a constructional explanatory view of the vehicle of the present invention.

As shown in FIG. 3, the frame 22 is set to a shape in which four spaces or clearances of a rectangular shape are formed in an inside space of an external framework member of a rectangular shape by a cross-shaped internal framework member. More particularly, the frame 22 is constructed by a first framework member 221 and a second framework member 222 arranged such that their longitudinal directions are respectively conformed to a forward-backward direction and a left-right direction of the vehicle 1. The height of the first framework member 221 and the height of the second framework member 222 are the same. On the other hand, the width $w_1$ of the first framework member 221 is designed so as to be wider than the width $w_2$ of the second framework member 222. Thus, a cross section perpendicular to the longitudinal direction of the first framework member 221 is larger than a cross section perpendicular to the longitudinal direction of the second framework member 222. Namely, the strength of the longitudinal direction of the second framework member 222 is designed so as to be lower than the strength of the longitudinal direction of the first framework member 221.

The frame 22 may be constructed in various shapes by an arbitrary combination method of the first framework member 221 and the second framework member 222, such as the case where the frame 22 is constructed by only the external framework member of a rectangular shape or the like.

As shown in FIG. 2, a designated article group is stored or arranged in the four clearances formed in the frame 22. The designated article group includes the fuel cell 11, the battery 12, the voltage raising device 13, the motor drive unit 14, the secondary battery 16, the voltage converter 17, the first auxiliary machine as a part of the auxiliary machine 18 constituting the FC system 112, and the electronic control unit 19. An arbitrary combination of articles including at least the fuel cell 11, the battery 12 and the voltage raising device 13 may be also set to the designated article group. The designated article group is assembled into the frame 22 and is then assembled onto the floor panel 20.

In accordance with the vehicle 1 of the above construction, the outputs of the fuel cell 11 and the battery 12 are raised in voltage by the voltage raising device 13, and electric power of these raised voltages is supplied to the motor 15 (see FIG. 1). Further, the electric power supply to the motor 15 using the fuel cell 11 and the battery 12 is assisted by the secondary battery 16 (see FIG. 1). Therefore, a total output voltage of the fuel cell 11 and the battery 12 can be reduced.

Thus, it is possible to reduce the number of cells laminated in the fuel cell 11, and the volume of the fuel cell 11, and the volume of the battery 12. Namely, it is possible to reduce a total volume of the designated article group including the fuel cell 11, the battery 12 and the voltage raising device 13 or the like, and thus, a mounting space of the designated article group in the vehicle 1. Further, the spaces of the upper side of the floor panel 20 and the lower side of the seat 24 in the interior space existing in the vehicle 1, or the clearances of the frame 22 for reinforcing the vehicle body can be utilized effectively as the mounting space of the designated article group without enlarging these spaces and clearances (see FIGS. 2 and 3).

Further, as mentioned above, since the total volume of the designated article group is reduced, a reduction in strength due to a reduction in weight of the frame 22 for the enlargement of the clearances can be avoided. Further, manufacture efficiency of the vehicle 1 is improved since the frame 22 is assembled into the vehicle body or the floor panel 20 after the designated article group is assembled into the frame 22 so as to be stored to the clearances. Further, the designated article group can be protected by the frame 22 from an impact applied to the vehicle.

Further, the strength of the longitudinal direction of the second framework member 222 constituting the frame 22 is designed so as to be lower than that of the first framework member 221. This is a result in which it is considered that the strength of the forward-backward direction of the vehicle body having a comparatively high possibility of receiving an impact by coming into contact with an object is preferably stronger than the strength of the left-right direction of the vehicle body. Accordingly, it is possible to correspondingly widen the clearances of the frame 22 as the mounting space of the designated article group demarcated by the first framework member 221 and the second framework member 222.

A total output value $\Sigma P$ of the fuel cell 11 and the battery 12 may be set to a target output value $P_0$ or more, and a first density $D_1$ ($=\Sigma P/\Sigma V$ or $\Sigma P/\Sigma M$) as a ratio of the total output value $\Sigma P$ to a total volume $\Sigma V$ or a total weight $\Sigma M$ of the designated article group may be also set to a first reference value $D_{10}$ or more. Thus, the total volume $\Sigma V$ or the total weight $\Sigma M$ of the designated article group including at least the fuel cell 11, the battery 12 and the voltage raising device 13 is restrained to a value ($=D_{10}/P_0$) or less provided by dividing the first reference value $D_{10}$ by the target output value $P_0$. Accordingly, while the electric power supply amount to the motor 15 is maintained in a necessary sufficient amount in view of stable running of the vehicle 1 and the like, the mounting space of the designated article group in the vehicle 1 is saved or the total weight of the vehicle can be reduced.

Further, a total capacity $\Sigma C$ of the fuel cell 11 and the battery 12 may be set to a target capacity $C_0$ or more, and a second density $D_2$ ($=\Sigma C/\Sigma V$ or $\Sigma C/\Sigma M$) as a ratio of the total capacity $\Sigma C$ to the total volume $\Sigma V$ or the total weight $\Sigma M$ of the designated article group may be also set to a second reference value $D_{20}$ or more. Thus, the total volume $\Sigma V$ or the total weight $\Sigma M$ of the designated article group is restrained to a value ($=D_{20}/C_0$) or less provided by dividing the second reference value $D_{20}$ by the target capacity $C_0$. Accordingly, While a total electricity accumulating amount able to be supplied to the motor 15 is maintained in a necessary sufficient amount in view of extension of a running distance of the vehicle 1 or the like, the mounting space of the designated article group in the vehicle 1 is saved or the total weight of the vehicle 1 can be reduced.

Further, constructional parts of the designated article group or the like are sub-assembled into the frame 22 so that the vehicle 1 mounting the fuel cell can be manufactured by merely adding the frame 22 as a subline on the existing manufacture line of an internal combustion engine and a hybrid vehicle. Namely, the vehicle 1 mounting the fuel cell can be manufactured by merely adding a line to the existing mass production vehicle manufacture line without newly making a dedicated manufacture line.

Therefore, entire manufacture cost of the vehicle 1 can be reduced.

Figure 4:
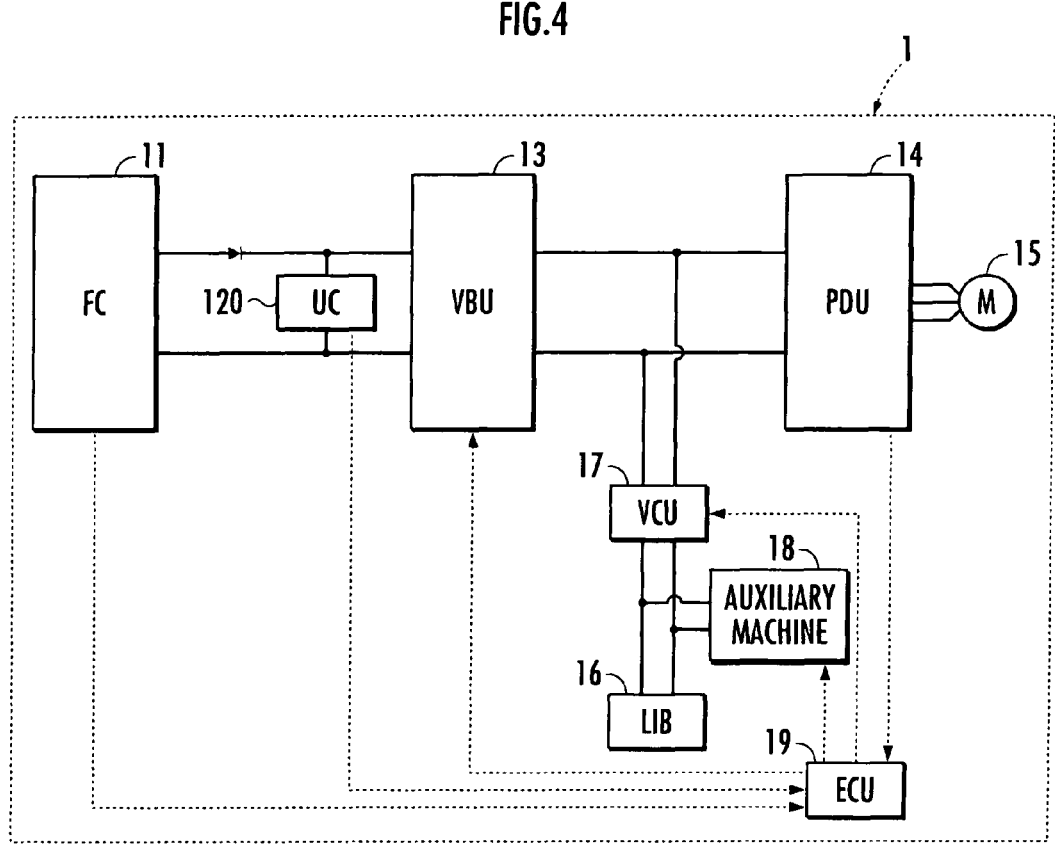
FIG. 4 is another constructional explanatory view of the vehicle of the present invention.
Figure 5:
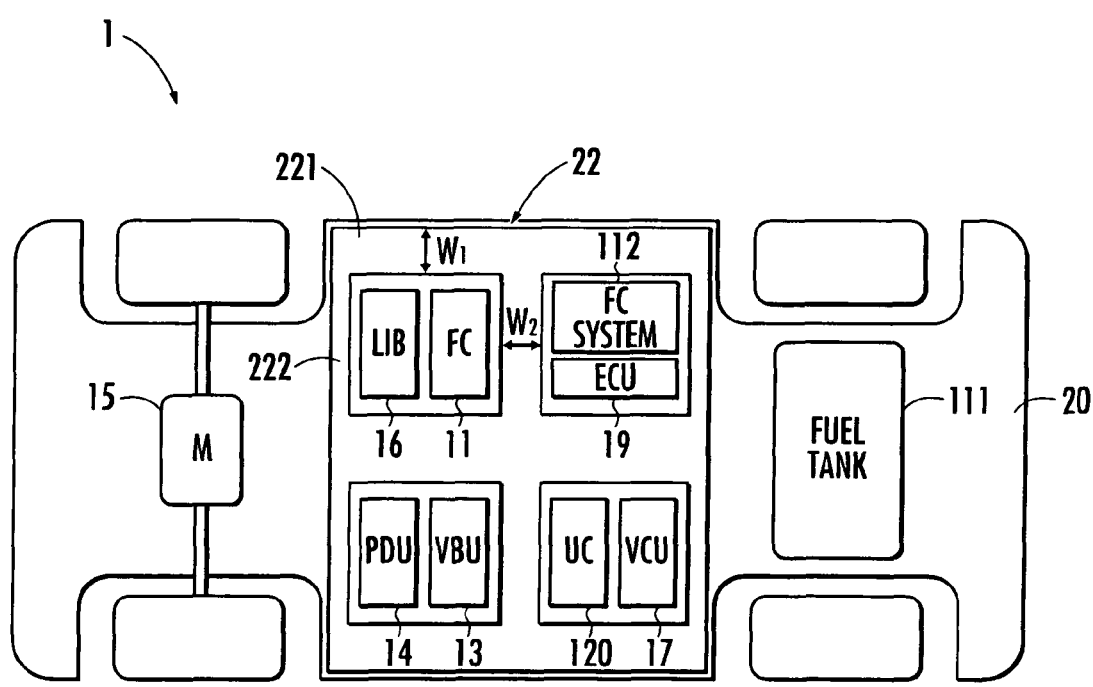
FIG. 5 is another constructional explanatory view of the vehicle of the present invention.

As shown in each of FIGS. 4 and 5, instead of the battery 12, a capacitor (UC) 120 may be also mounted to the vehicle 1. In this case, the space on the upper side of the floor panel and the lower side of the seat in the interior space existing in the vehicle 1 can be utilized effectively as a mounting space of the designated article group (including the fuel cell 11, the capacitor 120 and the voltage raising device 13) without extending this space on the upper side of the floor panel and the lower side of the seat.

What is claimed is:

1. A vehicle provided with a fuel cell and a motor for running, comprising:
   a battery;
   a voltage raising device in which the fuel cell and the battery are connected in parallel to an input section thereof, and an output section thereof is connected to the motor;
   an electronic control unit which controls an operation of the motor by adjusting electric power outputted from the fuel cell and the battery and supplied to the motor by a motor drive unit via a raise in voltage of the voltage raising device;
   wherein at least the fuel cell, the battery, and the voltage raising device are mounted in a space located on an upper side of a floor panel and a lower side of a seat in a vehicle interior space; and
   a frame for reinforcing a vehicle body is assembled onto the floor panel and arranged on the upper side of the floor panel and the lower side of the seat in the vehicle interior space,
   wherein the fuel cell, the battery, and the voltage raising device are assembled onto the frame and mounted or stored to a clearance of the frame.

2. The vehicle according to claim 1, wherein
the frame is constructed by combining a first framework member and a second framework member arranged such that their longitudinal directions are respectively conformed to a forward-backward direction and a left-right direction of the vehicle, and the strength of the longitudinal direction of the second framework member is designed so as to be lower than the strength of the longitudinal direction of the first framework member.

3. The vehicle according to claim 1, wherein
one or both of the electronic control unit and the motor drive unit are included in the group.

4. The vehicle according to claim 1, further comprising:
a voltage converter and a secondary battery connected to the output section of the voltage raising device through the voltage converter included in the group, wherein
electric power supplied from the secondary battery to the motor via the voltage converter and electric power supplied from the voltage raising device to the secondary battery via the voltage converter are controlled by controlling an operation of the voltage converter by the electronic control unit.

5. The vehicle according to claim 1, wherein
a total output value of the fuel cell and the battery is set to a target output value or more, and a first density as a ratio of the total output value of the fuel cell and the battery to a total volume or a total weight of the group is set to a first reference value or more.

6. The vehicle according to claim 1, wherein
a total capacity of the fuel cell and the battery is set to a target capacity or more, and a second density as a ratio of the total capacity of the fuel cell and the battery to a total volume or a total weight of the group is set to a second reference value or more.

7. The vehicle according to claim 1, wherein
the vehicle has a capacitor instead of the battery.

* * * * *